(No Model.) 2 Sheets—Sheet 1.

M. SNYDER & A. ROHT.
METHOD OF AND APPARATUS FOR CUTTING RUBBER SOLES.

No. 378,405. Patented Feb. 21, 1888.

ATTEST: INVENTORS:

(No Model.) 2 Sheets—Sheet 2.
M. SNYDER & A. ROHT.
METHOD OF AND APPARATUS FOR CUTTING RUBBER SOLES.
No. 378,405. Patented Feb. 21, 1888.
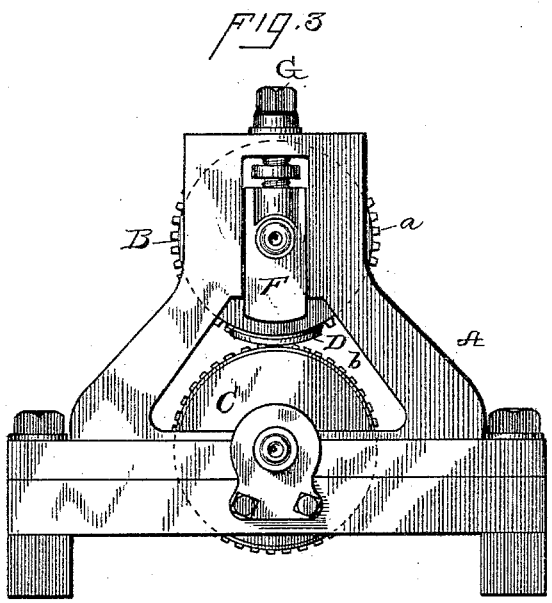
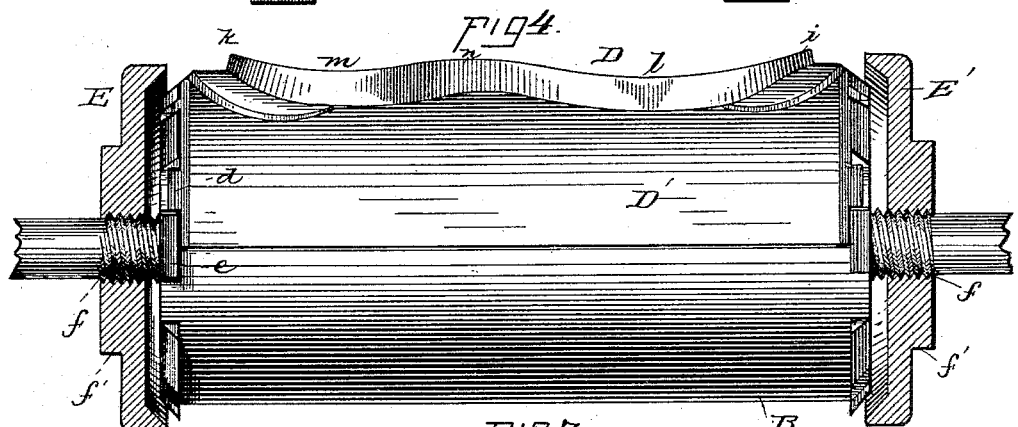
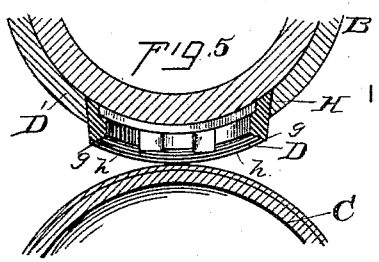

UNITED STATES PATENT OFFICE.

MARTIN SNYDER AND ANTONE ROHT, OF NEW BRUNSWICK, NEW JERSEY, ASSIGNORS TO THEMSELVES AND CLARENCE M. SLACK, OF SAME PLACE.

METHOD OF AND APPARATUS FOR CUTTING RUBBER SOLES.

SPECIFICATION forming part of Letters Patent No. 378,405, dated February 21, 1888.

Application filed March 21, 1887. Serial No. 231,625. (No model.)

*To all whom it may concern:*

Be it known that we, MARTIN SNYDER and ANTONE ROHT, both citizens of the United States, residing at New Brunswick, in the county of Middlesex and State of New Jersey, have invented a certain new and useful Improvement in Methods and Machines for Cutting the Soles of Rubber Boots and Shoes, of which the following is a specification.

The object we have in view is to produce a practical and efficient method and machine for cutting the soles of rubber boots and shoes, and for providing them at the same time with the proper bevel at their edges.

Machines have heretofore been proposed for cutting beveled soles from rubber goods; but they have been designed to act on the goods when cold, and since a bevel pressed on the cold goods will not remain they have failed to supplant the hand-cutting.

Our machine is designed to receive the goods directly from the calendering-machine while the rubber is still hot and in a condition to "run," and to maintain its heat so that it will run to the form of the cutting-dies, which are beveled from their cutting-edges inwardly, so as to give the soles beveled edges at the same time that they are cut completely from the goods.

Our machine acts continuously to dispose of the endless sheet of goods as fast as it comes from the calendering-machine.

Figure 1:
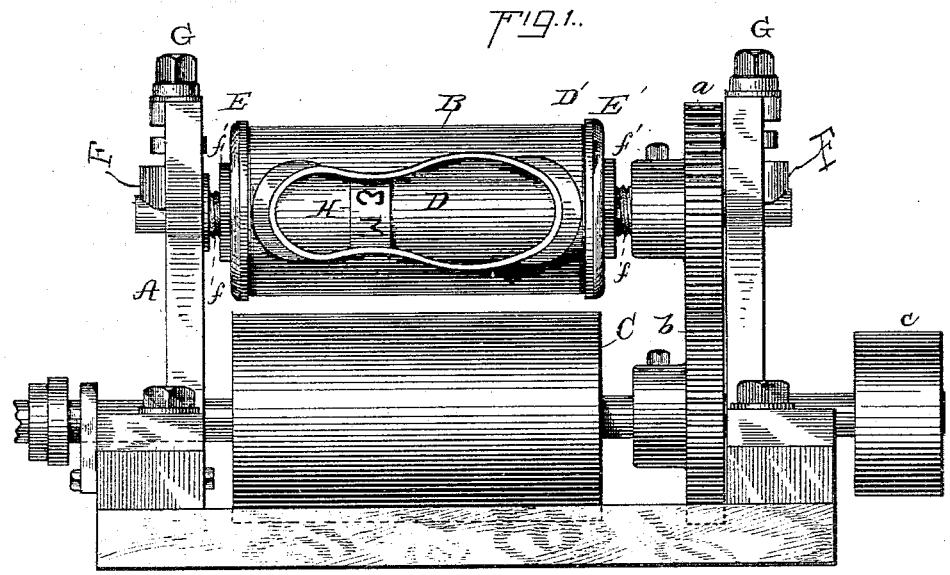
Figure 2:
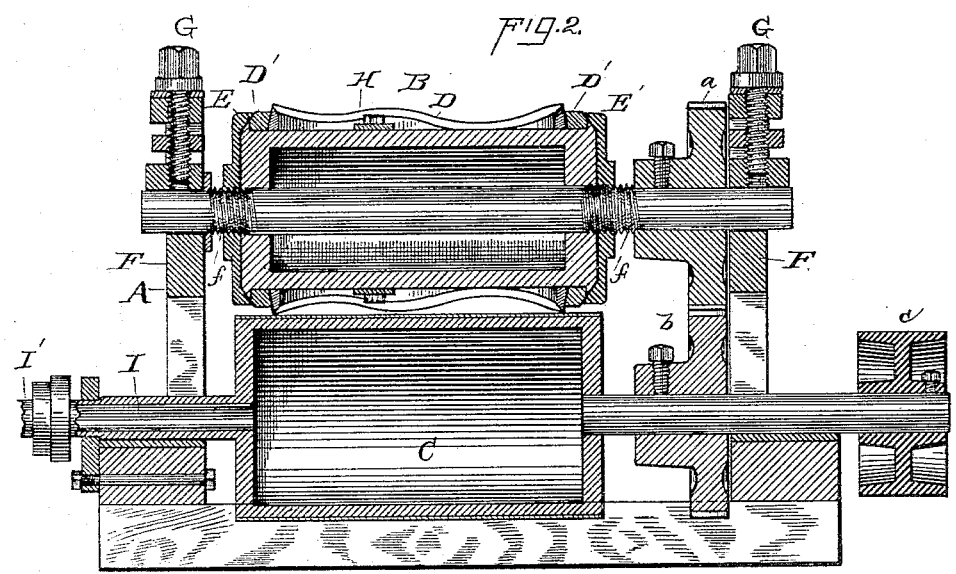
Figure 6:
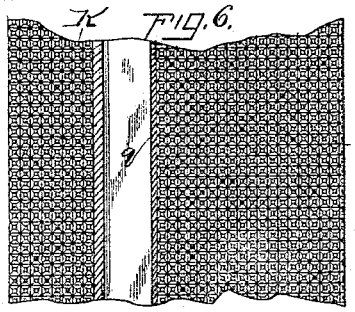

In the accompanying drawings, forming a part hereof, Figure 1 is a front elevation of a machine embodying our invention; Fig. 2, a vertical section of the same; Fig. 3, an end elevation; Fig. 4, a side elevation, on a larger scale, of the die-roller with one die mounted thereon and the clamping-disks at the ends of the roller in section; Fig. 5, a transverse section through one die and portions of the upper and lower rollers; Fig. 6, a view of the top of a portion of the sheet of goods as it comes from the calendering-machine; Fig. 7, a view of the bottom of a sole cut from this sheet, and Fig. 8 a longitudinal section through the cut sole.

In a suitable frame, A, are mounted two rollers, B C, arranged horizontally one above the other. Their shafts are geared together by cog-wheels $a\ b$, and one of them has a pulley, $c$, or a gear-wheel by which power is applied to the machine. The upper roller, B, carries one or more cutting and forming dies, D, two or more of such dies being preferably mounted upon this roller so as to follow one another as closely as practicable, in order to leave the minimum scrap. These dies fit the surface of the cylinder B, and are surrounded each by a holding-plate, D', which also fits the surface of the cylinder. The dies project through the holding-plates, as shown, but are retained therein by the flare which their sides and ends have relative to the sides of the openings in the holding-plates. The holding-plates extend the length of the cylinder B, their ends terminating in fingers $d$, which enter the spaces between teeth $e$ on the ends of this cylinder, so that the holding-plates can be readily arranged evenly and in proper line on the cylinder. The fingers $d$ and teeth $e$ are both beveled, as shown, and over these take the flaring edges of the clamping-disks E E', which turn on screw-threads $f$ on the shaft of the cylinder and serve to clamp the holding-plates firmly upon the cylinder, and thus secure the dies solidly in place. The clamping-disks have squared hubs $f'$, as seen in Fig. 1, by which they may be turned to clamp the holding-plates or release them.

It is intended that dies of different sizes can be used upon the machine, the holding-plates and dies being readily removed to permit of other holding-plates and dies being mounted upon the roller. The roller will be made long enough to accommodate the longest die. The holding-plates will all be of the same length, so that they may be secured by the clamping-disks; but the dies themselves will vary in size to cut the several sizes of soles required.

The roller B is mounted in sliding bearing-blocks F, which are adjusted vertically by screws G, to enable this roller to be properly adjusted to the lower roller, C, and to be varied somewhat in this adjustment to suit the dies used and the thickness of the goods to be operated upon. Each die has its outer edge, $g$, constructed to cut, and from this cutting-edge the die has an inward bevel, $h$. The die corresponds in shape to the sole of a rubber boot or shoe, the sides approaching closest at the shank and diverging to form the wider portions at the toe and heel. The edge $g$ of the die necessarily describes a cylinder in its movement, in order that it may roll in contact with the lower roller, C, the cylinder described by the edges of the die being of the same, or nearly the same, diameter as the lower roller, C. This gives the die a peculiar shape when viewed in side elevation, as seen in Fig. 4, or with reference to a horizontal plane. When so viewed, the edge of the die at the extreme points $i\ k$ of the toe and heel rise to the same elevation. From these points the edges curve downwardly until the center or widest parts, $l\ m$, of the toe and heel are reached, the edge at the widest part of the toe dropping lower than at the widest part of the heel, from the fact that the sole is wider at the toe than at the heel. From the lowest points, $l\ m$, the edges rise to the center $n$ of the shank, which, however, is not as high as the points $i\ k$ at the extreme ends of the toe and heel. As the rollers turn, the edge of the die strikes the goods first at the point $l$ on the advance side and then at the point $m$ on the advance side, after which the edge of the die enters the goods progressively until the entire sole is formed and cut from the goods. This progressive movement assists to make the action of the die more effective, in that both the cutting and running are more perfectly accomplished by this progressive or shearing action than if the die should enter the goods at all points at the same time. Each die is provided with a pressing-plate, H, for pressing the number and letter denoting the size of the boot or shoe upon the shank of the sole. This plate is held in a recess in the sides of the die next to the surface of the roller B, against which it is held by the die. The letter and figure carried by this plate H project outwardly sufficiently far to impress their outlines upon the sole at the shank without cutting through it or into it any farther than is required to make the characters plain.

The lower roller, C, is made hollow, of cast-iron or other suitable material, and has a steam-way, I, through its shaft for the admission of steam to keep the goods up to a running heat, such shaft being connected by a suitable packed working-joint with a stationary steam-pipe, I′, as will be well understood. The surface of the roller C is covered with some softer metal—such as zinc, or lead, or some suitable alloy or composition—so that the dies can sink into the surface slightly and completely sever the soles from the goods without injury to the edges of the dies.

The sheet of goods K as it comes from the calendering-machine is shown in Fig. 6. It has roughened toe and heel portions $o\ p$, which are thicker than the intermediate smooth shank portion, $q$, while the heel is thicker than the toe, as can be seen by the section of the sole shown in Fig. 8. The sole L as cut and run has a bevel-edge, $r$, for securing it to the upper and counter of the boot or shoe.

It is intended that the speed of our machine should be the same as that of the calendering-machine, so as to dispose of the goods as fast as it comes from the calendering-machine. The power-connection will be properly made through pulleys and belts, or through cog-wheels or other gearing, with the calendering-machine or with the line shafting to secure this result.

What we claim is—

1. In the machine herein described for cutting and forming rubber soles, the combination, with a revolving cutting-die having the shape of a sole and provided with beveled running edges, of means for maintaining the heat of the goods to the running point, substantially as set forth.

2. In the machine herein described for cutting and forming rubber soles, the combination, with a revolving cutting-die having the shape of a sole and provided with beveled running edges, of a revolving roller upon which the die acts and means for maintaining the heat of the goods to the running point, substantially as set forth.

3. In a machine for cutting and forming rubber soles, the combination, with a revolving cutting-die having the shape of a sole and provided with beveled running edges, of a revolving roller upon which the die acts, said roller being hollow and having a connection for admitting steam or other heating agent thereto, substantially as set forth.

4. In a machine for cutting and forming rubber soles from a heated sheet of goods, the combination, with a roller, of a die with a cutting-edge having the shape of a sole with a narrow shank, wider heel portion, and still wider toe portion, such cutting-edge describing a cylinder in its revolution and striking the goods first at the center of the toe, then at the heel, and then progressively toward the shank on the forward side and around the toe and heel to the shank on the rear side of the die, substantially as set forth.

5. In the machine herein described for cutting and forming rubber soles from a heated sheet of goods, the combination, with a continuously-revolving roller and means for maintaining the heat of the goods to the running point, of two or more sole-shaped cutting-dies provided with beveled running edges and located in succession upon said roller, and means for advancing the sheet of goods continuously under such die-roller, substantially as set forth.

6. In the machine herein described for cutting and forming rubber soles from a heated sheet of goods, the combination, with the continuously-revolving die-roller having one or more sole-shaped cutting-dies provided with beveled running edges and means for maintaining the heat of the goods to the running point, of a continuously-revolving roller upon which the dies act, the sheet of goods being continuously advanced between such rollers, substantially as set forth.

7. In a machine for cutting and forming rubber soles, the combination, with a roller, of one or more sole-shaped cutting-dies mounted removably thereon and provided with beveled running edges, and the hollow roll adapted to be heated for maintaining the goods to the running point, substantially as set forth.

8. In a machine for cutting and forming rubber soles, the combination, with the die-roller, of a holding-plate secured removably upon said roller, and a sole-shaped die held removably by such plate, substantially as set forth.

9. In a machine for cutting and forming rubber soles, the combination, with the die-roller having end teeth, of a die-holding plate having teeth engaging the teeth on the roller for fixing its position, a sole-shaped die carried by the holding-plate, and means for removably securing the holding-plate to the roller, substantially as set forth.

10. In a machine for cutting and forming rubber soles, the combination, with the die-roller having end teeth, of a die-holding plate having teeth engaging the teeth on the roller for fixing its position, a sole-shaped die carried by the holding-plate, and clamping-disks turning on screw-threads on the roller-shaft and clamping the ends of the holding-plate to the roller, substantially as set forth.

11. The method of cutting and forming rubber soles, consisting in heating a sheet of rubber goods to the running point, and passing said sheet while its heat is maintained under a revolving cutting and forming die, substantially as set forth.

This specification signed and witnessed this 15th day of March, 1887.

MARTIN SNYDER.
ANTONE ROHT.

Witnesses:
ROBT. W. HELM,
CHAS. B. HERBERT.